United States Patent [19]

Ishikawa et al.

[11] Patent Number: 5,047,944
[45] Date of Patent: Sep. 10, 1991

[54] VEHICLE CONTROL APPARATUS INCLUDING ABNORMALITY DETECTION

[75] Inventors: Hideaki Ishikawa, Katsuta; Taiji Hasegawa, Nakaminato; Osamu Abe, Katsuta, all of Japan

[73] Assignees: Hitachi, Ltd., Tokyo; Hitachi Automotive Engineering Co., Ltd., Ibaraki, both of Japan

[21] Appl. No.: 372,829

[22] Filed: Jun. 29, 1989

[30] Foreign Application Priority Data

Jul. 7, 1988 [JP] Japan .................................. 63-170013

[51] Int. Cl.⁵ ...................... B60K 31/02; G06F 11/20
[52] U.S. Cl. ............................. 364/431.11; 364/424.04
[58] Field of Search ................... 371/68.1, 68.2, 68.3; 364/426.04, 424.01, 424.03, 431.07; 73/119 A

[56] References Cited

U.S. PATENT DOCUMENTS

| | | | |
|---|---|---|---|
| 4,472,777 | 9/1984 | Youngblood | 364/426.04 |
| 4,527,424 | 7/1985 | Takahashi | 73/119 A |
| 4,539,642 | 9/1985 | Mizuno | 364/426.04 |
| 4,644,538 | 2/1987 | Cooper et al. | 371/68.1 |
| 4,698,762 | 10/1987 | Moriya et al. | 364/426.04 |
| 4,833,612 | 5/1989 | Okuno et al. | 364/426.04 |
| 4,860,211 | 8/1989 | Hatanaka et al. | 364/431.07 |

FOREIGN PATENT DOCUMENTS

| | | |
|---|---|---|
| 169693 | 1/1986 | European Pat. Off. |
| 270036 | 6/1988 | European Pat. Off. |
| 60-135332 | 7/1985 | Japan |
| 63-34243 | 2/1988 | Japan |
| 2138175 | 10/1984 | United Kingdom |
| 2154765 | 9/1985 | United Kingdom |

Primary Examiner—Felix D. Gruber
Attorney, Agent, or Firm—Antonelli, Terry, Stout & Kraus

[57] ABSTRACT

A vehicle control apparatus is provided with a plurality of unit controllers to individually provide control to different control items constructed such that mutual communication of data for diagnosis is effected between the unit controllers, and when one of the unit controllers comes to be abnormal, the other or others change their control mode so as to lead the vehicle to safety, based on the data from the one unit controller having come to be abnormal.

11 Claims, 6 Drawing Sheets

VEHICLE CONTROL APPARATUS INCLUDING ABNORMALITY DETECTION

BACKGROUND OF THE INVENTION

The present invention relates to an apparatus for controlling a vehicle having diversified control items, such as an automobile and, more particularly, to a vehicle control apparatus suitable for enhancing the safety of an automobile provided with an internal combustion engine, such as a gasoline engine.

Various kinds of controllers using a micro-computer have come to be employed in recent years. A variety of controllers with a micro-computer have now been applied to automobiles for the purposes of controlling the power transmission mechanism and the air conditioner, suspension control, or the like, in addition to various controls concerning the engine, in individual units.

Some conventional unit controllers are provided with a self-diagnosis function and a fail-safe function. However, they have no problem so long as each of the unit controllers exhibits reliably its fail-safe function but does not take into consideration the fact that when any abnormality occurs in any of various load driving circuits controlled by the unit controllers, the fail-safe function cannot be obtained.

For example, "Automobile Engineering" April, 1988, p. 41 roughly discloses that a mutual communication system between computers for control is employed in order to obtain an optimum control. However, the papers do not touch the above mentioned problem. Therefore, the conventional technique has a problem with respect to provision of sufficient reliability.

SUMMARY OF THE INVENTION

An object of the present invention is to provide a vehicle control apparatus which backs up the fail-safe function for a plurality of unit controllers of a vehicle and can always secure reliably sufficient safety of the vehicle.

More particularly, an object of the present invention is to provide a vehicle control apparatus in which a fail safe function provided for at least one of a plurality of unit controllers is backed up by another unit controller or controllers and sufficient safety can be always secured reliably.

The object described above can be accomplished by allowing at least one of a plurality of unit controllers to monitor abnormality of the other controller or controllers and to change the control mode of the unit controller having the abnormality so as to cope with the abnormality when the abnormality occurs in one of the unit controllers.

The object described above can be accomplished also by monitoring commonly a plurality of unit controllers and changing the control modes of unit controllers other than the unit controller or controllers from which the abnormality is detected as the monitor result.

Even when a certain unit controller loses its fail-safe function due to the occurrence of an abnormality, at least one of the other unit controllers will change its control mode to compensate for the drop of safety caused thereby, such as a decrease in a fuel supply quantity by an engine controller as one of the unit controllers for the abnormal increase in intake air due to abnormality of an auto-cruising controller as the other unit controller, for example, and since this counter-measure is provided, reliable back-up can always be obtained.

DESCRIPTION OF THE INVENTION

A vehicle control apparatus according to the present invention will be described with reference to various embodiments.

First of all, an embodiment of the vehicle control apparatus according to the present invention will be described hereunder in detail referring to FIGS. 1 to 6.

Figure 1:
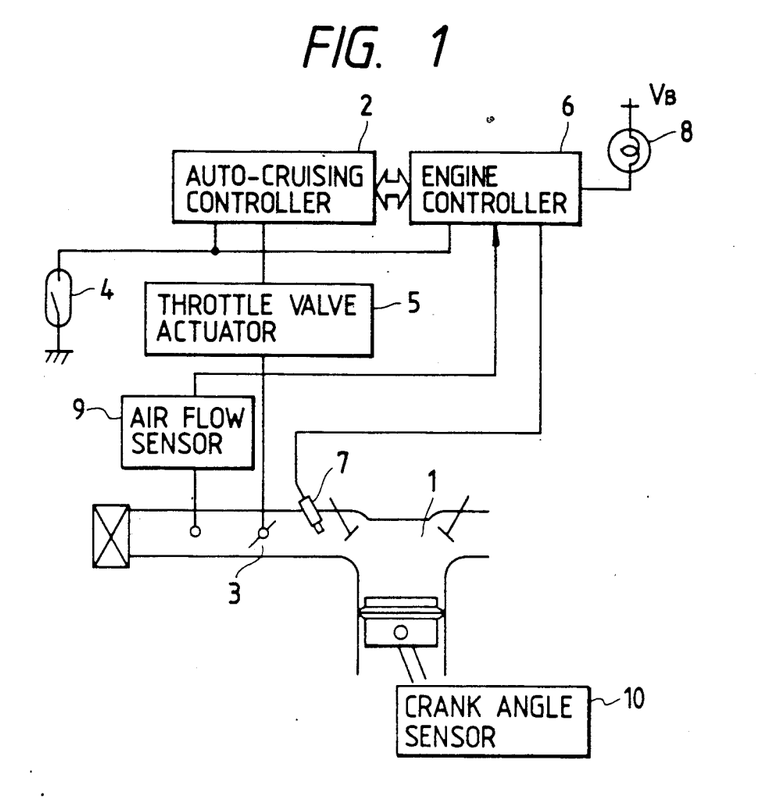
FIG. 1 is a block diagram showing an embodiment of a vehicle control apparatus according to the present invention.

In FIG. 1, an engine controller 6 and an auto-cruising controller 2 are employed among a plurality of unit controllers.

The engine controller 6 executes a calculation according to the following equation (1) on the basis of r.p.m. (N) of an automobile engine 1 detected by a crank angle sensor 10 and an intake air flow rate (Qa) detected by an air flow sensor 9 mounted in an intake passage of the engine 1, thereby to obtain a fuel injection pulse width Tp.

$$Tp = f(Qa \cdot N) \tag{1}$$

Then, the engine controller 6 supplies a pulse signal having this fuel injection pulse width Tp to a fuel injector drive circuit 61 (FIG. 3) which inputs a signal to a fuel injection valve 7 provided on the intake passage to drive it according to the fuel injection pulse width Tp thereby to execute a control so as to obtain a predetermined air-fuel ratio.

In parallel with such an operation, the engine controller 6 exchanges predetermined data with the auto-cruising controller 2, diagnoses the function of the auto-cruising controller 2, executes the operations to be later described when any abnormality is detected in this auto-cruising controller 2, and turns on an alarm lamp 8 to give an alarm to the user.

Figure 2:
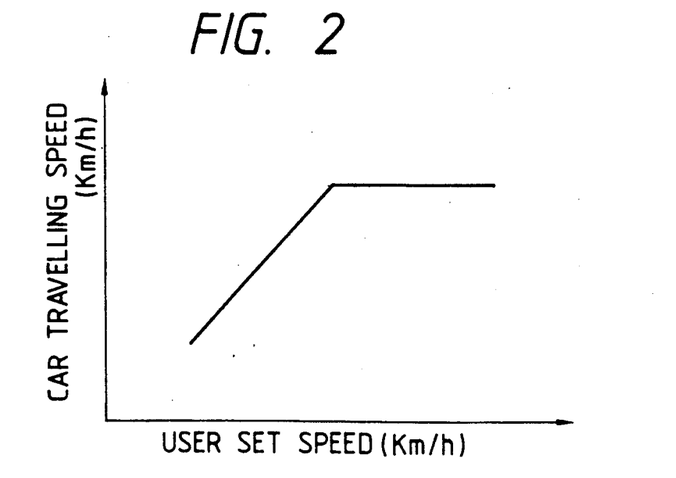
FIG. 2 is a characteristic diagram of an auto-cruising controller.

The auto-cruising controller 2 controls the rotating speed of the engine so that the vehicle travels automatically at a constant speed set by the user (driver), the relation between the set speed by the user and the traveling speed of the car being shown in FIG. 2.

Figure 3:
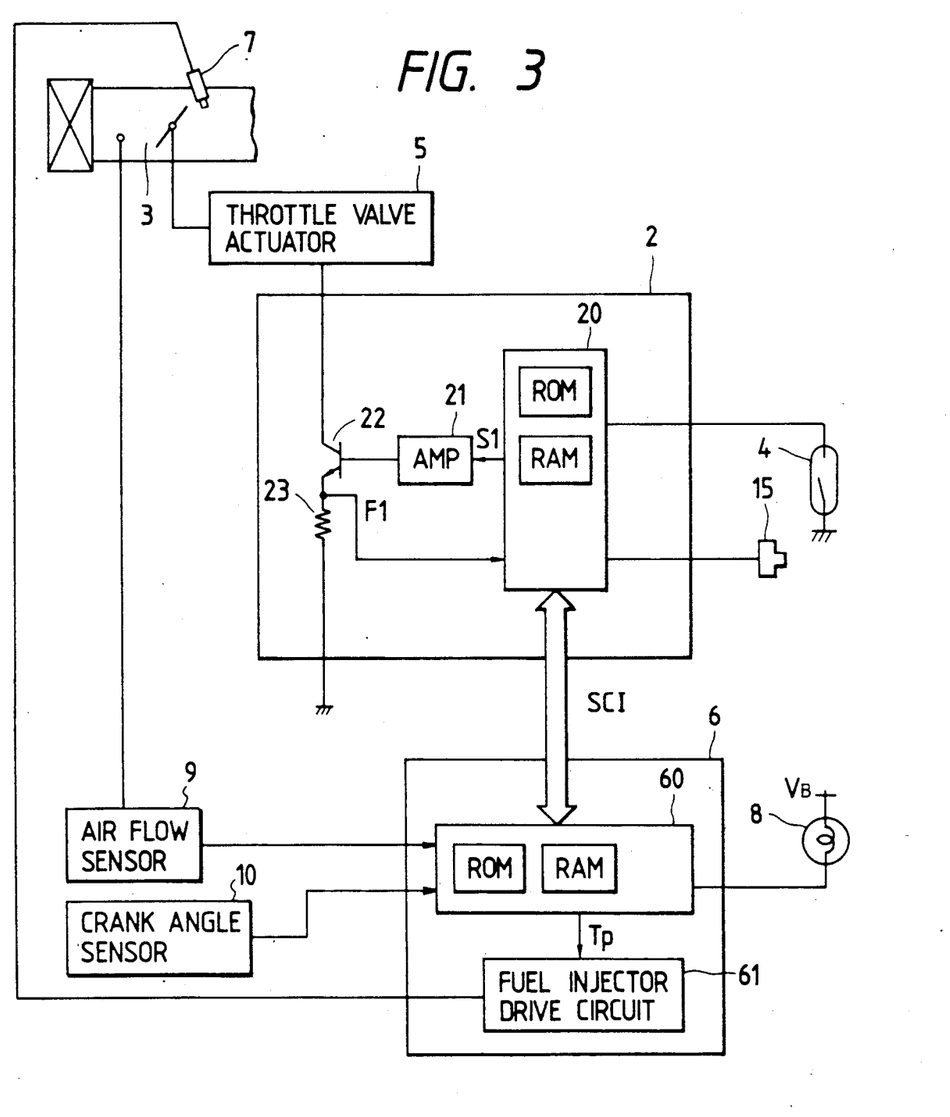
FIG. 3 is a block diagram showing details of a part of FIG. 1.

Referring to FIG. 3, the auto-cruising controller 2 includes a micro-computer 20, an amplification circuit 21, an output driving device (power transistor) 22, a resistor 23 and a speed set switch 15. The micro-computer 20 receives, as a set car speed, the car speed from the car speed sensor 4, which car speed is set by the user through a pushing operation of the speed set switch 15, its value being the car speed at the time the speed set switch 15 is pushed, and, stores the set car speed in RAM, calculates an opening signal ($S_1$) of the throttle valve 3 using the set car speed, controls the throttle valve actuator 5 through the amplification circuit 21 and the output driving device 22 to control the opening of the throttle valve 3 and executes feedback control so that the actual car speed detected from the car speed sensor 4 converges with the set car speed.

At this time, a current flowing through the output driving device (power transistor), that is, a current supplied to the throttle valve actuator 5, flows through the resistor 23 so that a predetermined signal Fl can be obtained. Therefore, the micro-computer 20 receives this signal F1, performs a self-diagnosis or self-checking by judging whether or not its level is within a predetermined range and executes a fail-safe control.

In this embodiment, a data transfer system involving a SCI (Serial Communication Interface) is disposed between the auto-cruising controller 2 and the engine controller 6 so that data transfer can be made between the auto-cruising controller 2 and the engine controller 6. Among the data of the auto-cruising controller 2 which is supplied to the micro-computer 20, predetermined data is also forwarded to the micro-computer 60 of the engine controller 6, and among the data of the micro-computer 60, some necessary data is also transferred to the micro-computer 20.

Next, the case where any abnormality occurs in the auto-cruising controller 2 will be explained.

It will be now assumed that a short-circuit cruising controller 2 for some reason or other with the result that a current keeps flowing through the actuator 5. In such case the throttle valve 3 is kept fully open because the actuator 5 is constructed such that the throttle valve 3 is always urged by a spring to close and driven by an electromagnetic means to be opened against the spring force. Because the throttle valve 3 is kept fully open, the intake air flow rate increases drastically and since the engine controller 6 increases the quantity of the fuel injected from the fuel injection valve 7 in accordance with this intake air flow rate Qa, as expressed by the afore-mentioned equation (1), uncontrolled driving is likely to occur irrespective of the driver's intention of auto-cruising.

This malfunction cannot be prevented by the fail-safe control of the auto-cruising controller 2 itself at this time. In other words, the fail-safe control at this time can only switch the control signal for the output driving device 22 OFF through the amplification circuit 21 and cannot at all cope with the short-circuit condition of this output driving device 22.

In this embodiment, the micro-computer 20 in the auto-cruising controller 2 detects the current flowing through the output driving device 22 from the signal F1 resulting from the voltage drop of the resistor 23 as described above, makes a judgement for self-diagnosis processing depending on whether or not the current exceeds a predetermined value and transmits the result to the engine controller 6.

When the short-circuit condition described above occurs, therefore, the malfunction is recognized by the micro-computer 60 of the engine controller 6. More definitely, the micro-computer 20 of the auto-cruising controller 2 transmits the data indicating that "the throttle valve 3 is fully open due to the short-circuit of the output driving device 22" to the micro-computer 60 of the engine controller 6.

In response thereto, the micro-computer 60 reduces the pulse width Tp described already without regard to the measured intake airflow rate so as to reduce the fuel quantity supplied from the fuel injection valve 7, thus to limit the increase in the speed of the engine 1, and to light the alarm lamp 8 to give the alarm to the user.

Therefore, in accordance with this embodiment, the auto-cruising controller 2 forming one of the unit controllers can be backed up by the engine controller 6 forming another unit controller even when the fail-safe function of the auto-cruising controller 2 does not operate effectively, and the uncontrolled operation of the engine 1 can be prevented reliably.

Next, the processing described above will be explained with reference to the flowchart shown in FIGS. 4a and 4b.

Figure 4A:
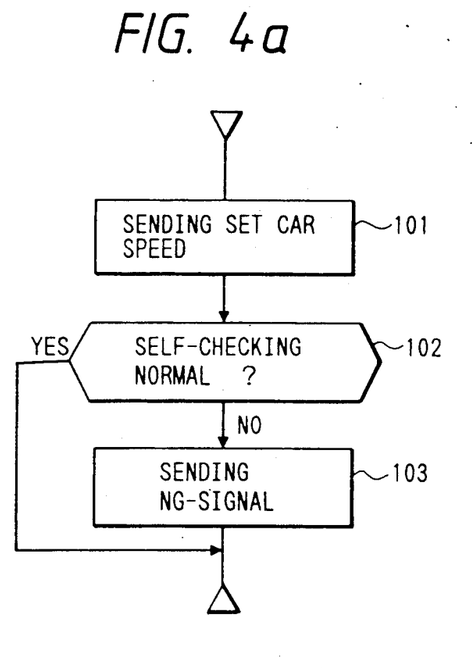
FIGS. 4a and 4b each are a flowchart for explaining the vehicle control apparatus.

First of all, the micro-computer 20 of the auto-cruising controller 2 executes the processing shown in FIG. 4a in each predetermined period. In other words, a set car speed value, which is set by the driver and inputted into the micro-computer 20, is sent to the engine controller 6 at step 101. Self-diagnosis or self-checking, such as whether or not the current F1 is in a predetermined range, is made at step 102, and the result is transferred to the engine controller 6 at the subsequent step 103. In other words, an NG signal representing a not-normal condition is transferred when any abnormality is detected.

Figure 4B:
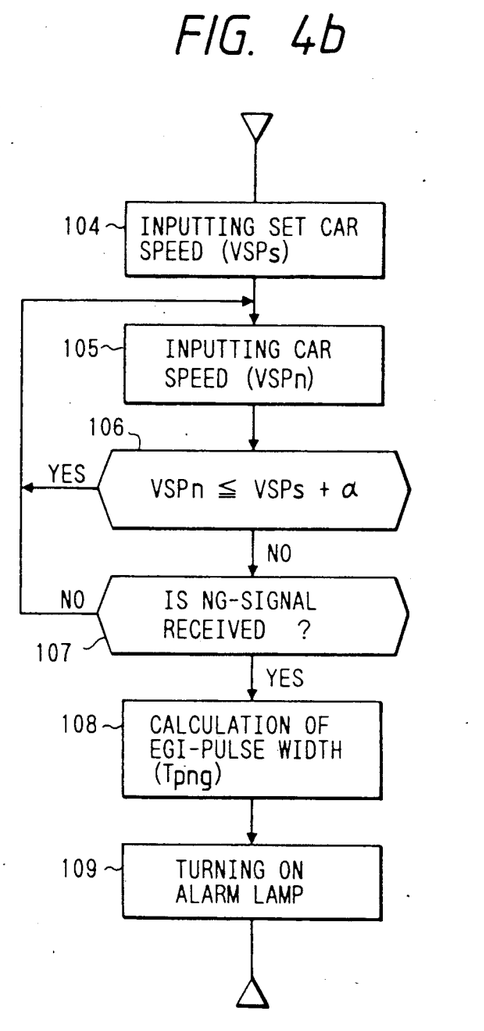
Figure 5:
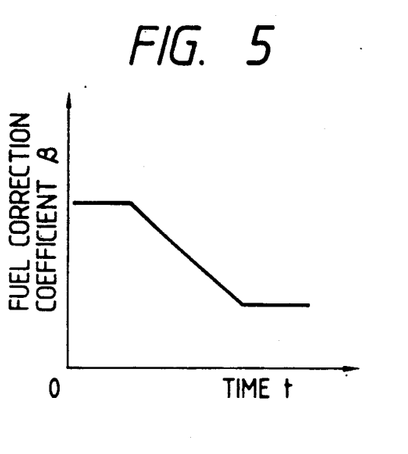
FIG. 5 is a characteristic diagram of a fuel correction coefficient.

On the other hand, the micro-computer 60 of the engine controller 6 executes the processing shown in FIG. 4b. Namely, the set car speed value VSPs is taken into the micro-computer 60 from the micro-computer 20 at step 104 and an actual car speed VSPn is received from the speed sensor 4 through the micro-computer 20 at step 105. At the subsequent step 106, whether or not this actual car speed VSPn exceeds the sum of the set car speed value VSPs and a value $\alpha$ which is added in order to provide the former with a predetermined allowance range is judged. If the result proves to be NO, the flow proceeds to step 107, where whether or not the NG signal is received is judged. If the result proves to be YES here, the micro-computer 60 judges that an abnormality occurs in the auto-cruising controller 2 and the possibility of uncontrolled operation of the engine exists. Then, steps 108 and 109 are executed. Namely, a fuel correction coefficient $\beta$ having a numeric value of below 1.0 is multiplied by the ordinary EGI (fuel injection) pulse width Tp, outputs the product as a fuel injection pulse width Tpng ($=\beta \cdot Tp$) at the time of abnormality and executes the alarm lamp ON processing at the subsequent step 109. In this case, the fuel correction coefficient $\beta$ changes in a decreasing direction as a function of the time t elapsed from the point (to) of the occurrence of abnormality as shown in FIG. 5, for example.

Figure 6:
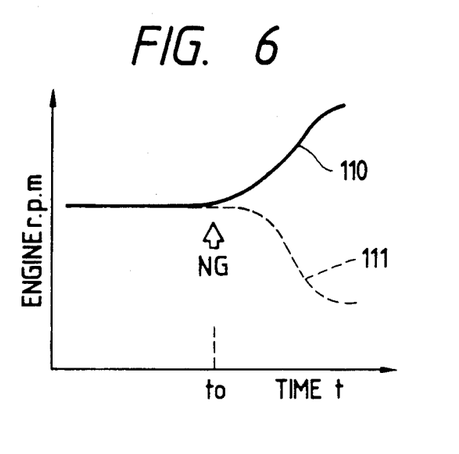
FIG. 6 is a characteristic diagram of the auto-cruising controller.

According to this embodiment, therefore, the control by which the number of revolution N of the engine is decreased with the passage of time t after the point (to) of the occurrence of abnormality in the auto-cruising controller 2 is made automatically as represented by dashed line 111 in FIG. 6, and back-up can be obtained reliably. Incidentally, the characteristics represented by solid line 110 in this drawing show the case where back-up by this embodiment cannot be obtained, and represents that the number of revolution of the engine increases with the passage of time and a critical state will be reached.

In the embodiment described above, the auto-cruising controller 2 and the engine controller 6 make direct mutual data communication to obtain the necessary back-up data communication to obtain the necessary back-up function.

Next, another embodiment of the present invention will be explained with reference to FIG. 7.

Figure 7:
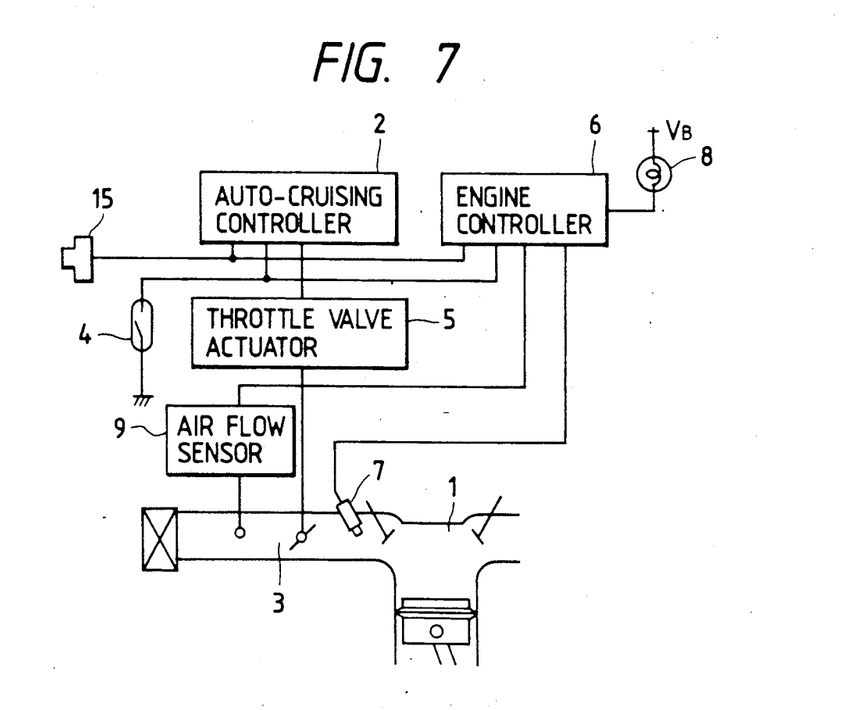
FIG. 7 is a block diagram showing another embodiment of a vehicle control apparatus according to the present invention.

The embodiment shown in FIG. 7 represents a structural example of a vehicle control apparatus including an auto-cruising controller and an engine controller among a plurality of unit controllers that do not have a mutual data communication function. The construction in FIG. 7 is the same as one in FIG. 1 except that a car speed setting switch 15 is connected to a micro-computer 60 so that a set car speed can be inputted into the micro-computer 60. Therefore, explanation about the other construction is omitted. Further, the same parts or apparatus in FIG. 7 as ones in FIG. 1 are referred to by the same reference numerals.

Figure 8:
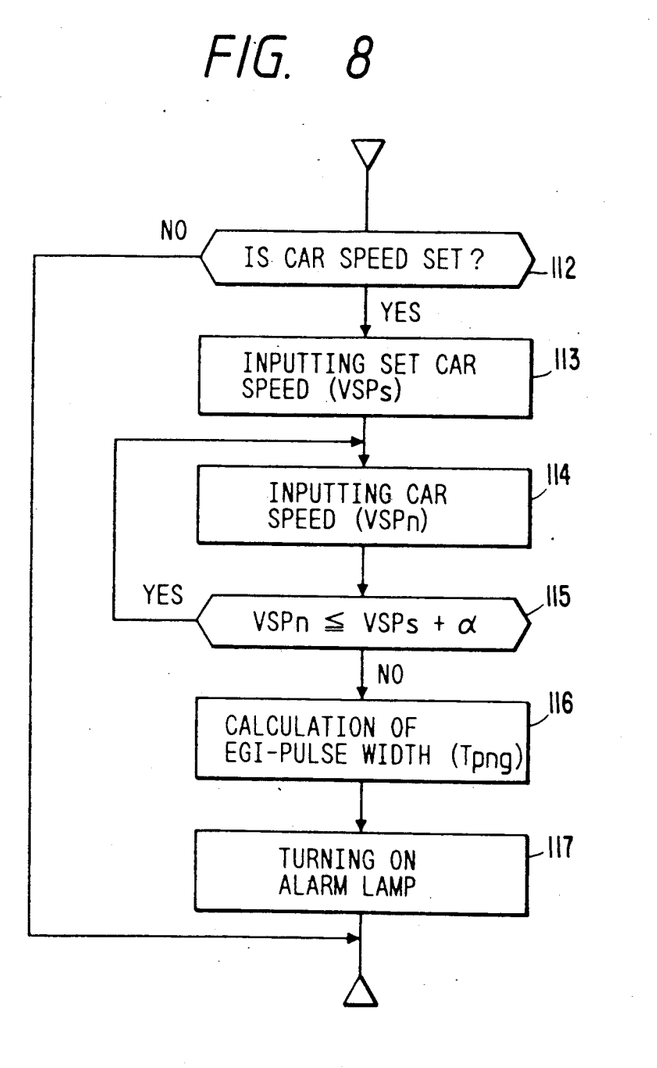
FIG. 8 is a flowchart for explaining the vehicle control apparatus shown in FIG. 7.

Next, the operation of this embodiment will be explained with reference to the flowchart of FIG. 8.

First of all, at step 112, the signal of the car speed setting switch 15 for setting a car speed on the auto-cruising controller 2 is received to judge whether or not the car speed is set.

If the result is YES, the set car speed is received at step 113 to obtain the data VSPs. Processing is completed there if the results at the step 112 is NO.

At step 114, the actual car speed VSPn is taken into and at the subsequent step 115, this car speed VSPn is compared with a certain predetermined car speed reference value $VSPs + \alpha$. When the car speed value VSPn is more than the car speed reference value $VSPs + \alpha$, judgement is made to the effect that any abnormality occurs in the auto-cruising controller 2 and here the next step 116 is executed. Namely, the normal fuel injection pulse width Tp is multiplied by the correction coefficient $\beta$ to execute the fuel injection pulse width $T_{PNG}$ at the time of abnormality and the alarm lamp 8 is lit at the subsequent processing of step 117 to complete the processing.

According to this embodiment, too, it is possible to obtain sufficient back-up, to check reliably the uncontrolled operation of the engine and to secure sufficient safety even when any abnormality occurs in the auto-cruising controller 2 and moreover when the fail-safe function for it does not operate.

Figure 9:
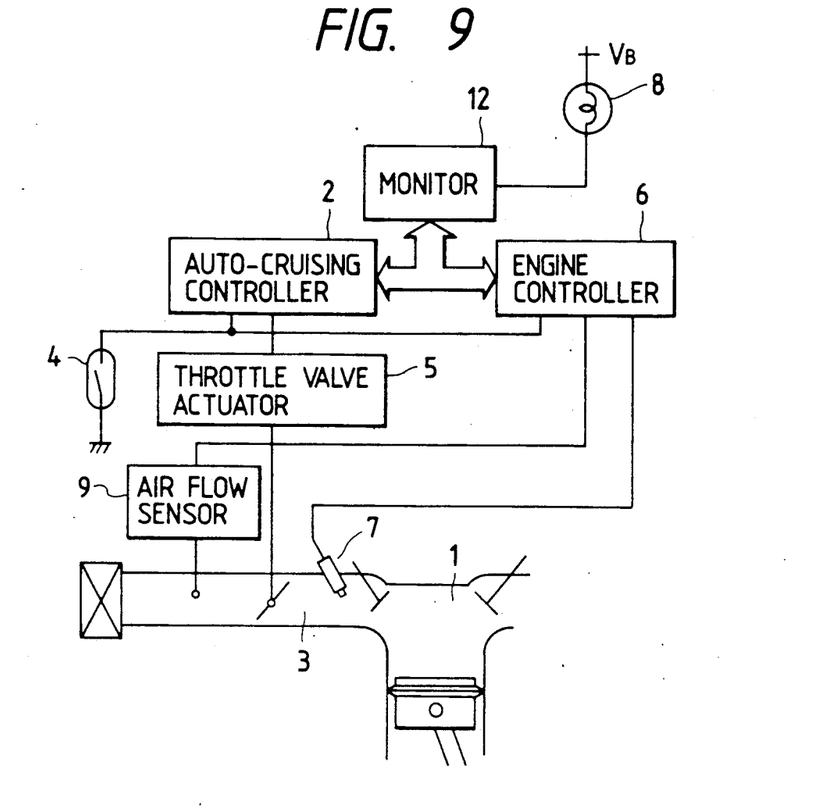
FIG. 9 is a block diagram showing still another embodiment of a vehicle control apparatus according to the present invention.
Figure 10:
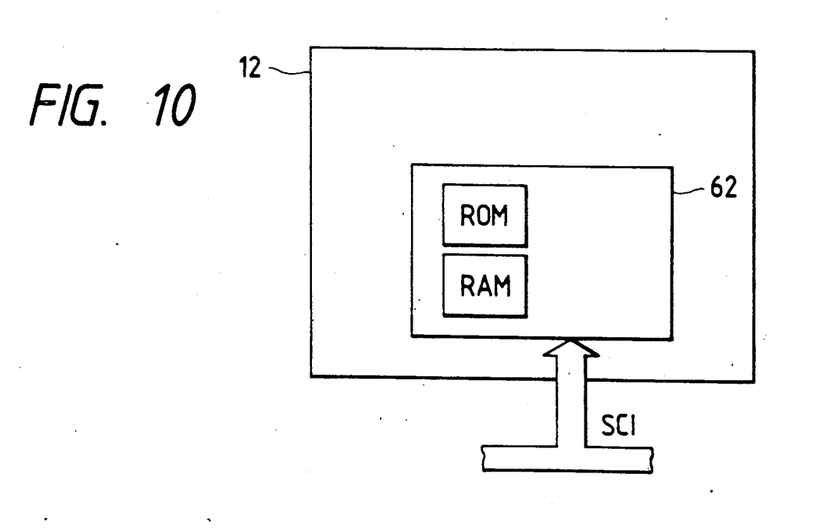
FIG. 10 is a block diagram showing details of a monitor employed in FIG. 9.

Next, FIG. 9 shows still another embodiment of the present invention. In this embodiment, the auto-cruising controller 2 and the engine controller 6 do not individually make the abnormality judgement but a monitor 12 disposed separately from, and independently of them, makes the abnormality judgement. The monitor 12 is constructed by a micro-computer 62 as shown in FIG. 10. Data communication between the auto-cruising controller 2, the engine controller 6 and the monitor 12 is carried out by SCI.

In this embodiment, it is possible to effect data communication between the auto-cruising controller 2 and this monitor 12 in the same way as in the embodiment shown in FIG. 1 so as to obtain the back-up function. It is also possible to employ the structure where the data communication function is not provided in the same way as in the embodiment shown in FIG. 7 but the monitor 12 executes the back-up processing by inputting the signal from the car speed sensor 4 to the monitor 12.

Although the present invention has been explained with reference to the foregoing embodiments wherein abnormality detection between the engine controller and the auto-cruising controller and between them and the monitor is made, the present invention is not particularly limited thereto but can of course be practised in other ways. Needless to say, the present invention may be constituted for the purpose of providing back up between the unit controllers and any other control items as the control object.

Although the foregoing embodiments deal with the case where a certain unit controller changes its own control made when it diagnoses the abnormality of other unit controllers, it is of course possible to employ the construction wherein the function of the unit controller itself from which the abnormality is detected is stopped.

As described above, the present invention can be applied to any controllers, such as an air conditioner, a suspension controller, a power transmission controller, and the like, that are mounted into a vehicle, as the unit controller, and back-up can of course be obtained between these controllers when the abnormality diagnosis and fail-safe function therebetween cannot be obtained.

According to the present invention, sufficient back-up can be obtained at the time of the occurrence of abnormality in various unit controllers, such as the auto-cruising controller and the engine controller of a vehicle, and there can be obtained the effect that safety can be always secured reliably.

What is claimed is:

1. A control apparatus for controlling a vehicle having a plurality of devices which operate to carry out different functions, respectively, through control applied thereto, said control apparatus comprising:
   a plurality of unit controllers for controlling said devices respectively, at least one of said unit controllers having a self-diagnosis function and including means for outputting a signal representing a judgement result of self diagnosis when an abnormality is detected in an operation of said one unit controller;
   data transfer means for allowing said one unit controller to transfer the signal representing a result of self diagnosis to at least one other unit controller; and
   means provided in said other unit controller for changing, in response to said signal representing a result of self diagnosis from said one unit controller, a control mode of said other unit controller to a predetermined control mode in which safety will be ensured in the operation of said vehicle.

2. A vehicle control apparatus according to claim 1, wherein said unit controller or controllers in which said abnormality is detected are caused to stop the control function thereof.

3. A control apparatus for controlling a vehicle having a plurality of portions which operate to carry out respectively different functions in the operation of the vehicle through the control applied thereto, said control apparatus comprising:

a plurality of unit controllers for controlling said portions, respectively;

function diagnosis means for monitoring said plurality of unit controllers in common to detect an abnormality therein; and means for changing a control mode of at least one of said unit controllers other than a unit controller or controllers in which an abnormality is detected in accordance with a judgement result of said function diagnosis means.

4. A control apparatus for controlling a vehicle having a plurality of portions which operate to carry out different functions, respectively, said control apparatus comprising a plurality of unit controllers each for controlling a respective one of said portions; function diagnosis means disposed in at least one of said plurality of unit controllers for detecting an abnormality in at least another one of said unit controllers and means for changing a control mode of said one unit controller other than said unit controller or controllers in which an abnormality is detected in accordance with the abnormality detection by said function diagnosis means.

5. A control apparatus for controlling a vehicle having a plurality of individual portions which operate to carry out functions different from each other, respectively, said control apparatus comprising a plurality of unit controllers individually provided to control respective ones of said portions, said unit controllers each having a self-diagnostic function, and means for sending a signal for diagnosis from at least a first unit controller of said plurality of unit controllers to at least a second unit controller of the plurality of unit controllers, and means for changing a control mode of said second unit controller on the basis of said signal for diagnosis from said first unit controller.

6. A vehicle control apparatus according to claim 5, wherein said first unit controller is an auto-cruising controller, said second unit controller has its control mode changed so that vehicle speed decreases when said auto cruising controller comes to be abnormal.

7. A control apparatus for controlling a vehicle having a plurality of individual portions which operate to carry out specific functions different from each other, respectively, said control apparatus comprising a plurality of unit controllers individually provided to control respective ones of said portions, said unit controllers each having a self-diagnostic function, wherein a second unit controller is provided with means for receiving data for controlling a first unit controller and for effecting diagnosis of said first unit controller to control said second unit controller on the basis of said data when an abnormality takes place in said first controller, so as to secure safety of the vehicle operating under an uncontrolled condition due to the abnormality.

8. A control apparatus for controlling a vehicle having at least two different portions controlled to carry out functions different from each other, respectively, said control apparatus comprising an auto-cruising controller for controlling one of said portions of the vehicle so as to cause said vehicle to travel at a set speed on the basis of data, including an actual vehicle traveling signal detected by a speed sensor and a set speed signal, and engine controller for controlling the other of said portions of the vehicle so as to inject an optimum amount of fuel by an injector on the basis of engine conditional data including a throttle opening amount and engine speed and means for transferring an abnormality signal relating to a result of diagnosis of said auto-cruising controller to said engine controller, said engine controller including means for generating a signal for decreasing a fuel injection amount in response to an abnormality signal received from said auto-cruising controller and for sending said control signal to said fuel injector thereby to obtain security of vehicle operation when an abnormality takes place in said auto-cruising controller.

9. A vehicle control apparatus according to claim 8, wherein said control signal generating means has a function of generating a control signal to be applied to said fuel injector for injecting a fuel injection amount which decreases with passage of time from a time said abnormality is detected in said auto-cruising controller.

10. A control apparatus for controlling a vehicle having at least two different portions controlled to carry out functions different from each other, respectively, said control apparatus comprising an auto-cruising controller for controlling one of said portions of the vehicle so as to cause said vehicle to travel at a set speed on the basis of data including an actual vehicle traveling signal detected by a speed sensor and a set speed signal, and an engine controller for controlling the other of said portions of the vehicle so as to inject an optimum amount of fuel by an injector on the basis of engine conditional data including a throttle opening and engine speed, wherein said engine controller is connected to said speed sensor and a speed setting means for setting a desired vehicle traveling speed and includes means for judging an abnormality of said auto-cruising controller on the basis of data from said speed sensor and speed setting means.

11. A control apparatus for controlling a vehicle having at least two different portions controlled to carry out functions different from each other, respectively, said control apparatus comprising an auto-cruising controller for controlling one of said portions of the vehicle so as to cause said vehicle to travel at a set speed on the basis of data including an actual vehicle traveling speed detected by a speed sensor and a set speed signal, and an engine controller for controlling the other of said portions of the vehicle so as to inject an optimum amount of fuel by an injector on the basis of engine conditional data including a throttle opening and engine speed, wherein a monitor means for monitoring abnormality in said auto-cruising controller is provided separately from said auto-cruising controller and said engine controller, said monitor means being connected to both said auto-cruising controller and engine controller by a serial communication interface so that said engine controller is controlled in response to a signal of monitored abnormality of said auto-cruising controller to secure safety of the vehicle.

* * * * *